United States Patent [19]

Iwaki et al.

[11] Patent Number: 5,544,252

[45] Date of Patent: Aug. 6, 1996

[54] RANGEFINDING/AUTOFOCUSING DEVICE OF JOINT TRANSFORM CORRELATION TYPE AND DRIVING METHOD THEREOF

[75] Inventors: Tadao Iwaki; Yasuyki Mitsuoka; Nobuyuki Kasama, all of Tokyo, Japan

[73] Assignee: Seiko Instruments Inc., Japan

[21] Appl. No.: 939,130

[22] Filed: Sep. 2, 1992

[30] Foreign Application Priority Data

Sep. 6, 1991 [JP] Japan .................. 3-227402

[51] Int. Cl.[6] .................................. G06K 9/64
[52] U.S. Cl. .................. 382/280; 354/402; 359/561
[58] Field of Search .................. 382/42, 31, 43; 364/822; 359/561; 356/3, 4, 390; 354/402, 400, 406; 250/201.8, 201.4; 348/345, 348, 358, 222

[56] References Cited

U.S. PATENT DOCUMENTS

| | | | |
|---|---|---|---|
| 4,002,899 | 1/1977 | Stauffer | 250/201.8 |
| 4,465,366 | 8/1984 | Schmidt | 356/390 |
| 4,832,447 | 5/1989 | Javidi | 364/822 |
| 5,029,220 | 7/1991 | Juday | 382/43 |
| 5,040,140 | 8/1991 | Horner | 382/42 |
| 5,175,775 | 12/1992 | Iwaki et al. | 382/31 |
| 5,216,541 | 7/1993 | Takesue et al. | 382/31 |
| 5,237,167 | 8/1993 | Hibbard | 250/201.8 |

Primary Examiner—Joseph Mancuso
Attorney, Agent, or Firm—Bruce L. Adams; Van C. Wilks

[57] ABSTRACT

A rangefinding/autofocusing apparatus utilizes a joint transform correlator of a Fourier correlation optical system. A pair of imaging lens systems form a pair of object input images. A lens driving mechanism drives the imaging lens systems in a parallel manner. The pair of object input images are recorded for display. A reference input image is displayed concurrently along with the recorded object input images in an offset relation relative to each other. A photodetector disposed on the correlation plane of the Fourier correlation optical system detects correlation peaks corresponding to a correlation coefficient of the pair of displayed object input images to measure an interval between the detected correlation peaks. The photodetector also detects correlation peaks corresponding to a correlation coefficient of the reference input image and the object input images to determine a correlation between the reference image and the object. A calculation unit calculates a distance between the object and the imaging lens systems to determine a just-focused state of the object depending on the measured interval. The lens driving mechanism shifts the imaging lens systems to thereby establish the just-focused state of the object. A target object is recognized depending on the correlation between the reference image and the object after the just-focused state is established.

26 Claims, 6 Drawing Sheets

RANGEFINDING/AUTOFOCUSING DEVICE OF JOINT TRANSFORM CORRELATION TYPE AND DRIVING METHOD THEREOF

BACKGROUND OF THE INVENTION

The present invention relates to rangefinding/autofocusing devices provided in various optical apparatuses for automatically carrying out pattern recognition and optical measurement etc. in the field of optical information processing and optical sensing technology.

Conventionally, various types of the autofocusing devices have been developed for facilitating handling of pick-up instruments such as a photographic camera and CCD camera. These include, for example, one type utilizing ultrasonic emission to measure a time delay of reflection, and another type utilizing infrared radiation to measure a reflected radiation intensity. However, another interesting type of autofocusing device is based on optical triangulation to effect rangefinding and autofocusing.

The optical triangulation method is advantageous in precisely carrying out rangefinding/autofocusing over a relatively wide range from a far distance to a near distance. The typical triangulation method of the prior art utilizes a pair of CCD cameras for concurrently picking up an object such as to measure an offset between barycenters of respective pictures of the same object. For example, if the barycenter offset coincides with a span between centers of imaging lenses of the respective CCD cameras, the object is determined to exist in a far infinitive distance. Without regard to whether an image of the object is accurately focused on a photoelectric conversion plane of CCD, the distance of the object can be precisely calculated relative to the CCD photoelectric conversion plane based on geometric parameters including a span between imaging lens centers of the CCD camera pair and a spacing between the CCD imaging lens center and the CCD photoelectric conversion plane, unless the object image is seriously out of focus.

However, the conventional rangefinding/autofocusing device of the triangulation type has a drawback in that the instant calculation of the barycenter of the object image is practically difficult when using a simple processor. Generally, the object image or picture is represented in a gray level scale which requires a vast amount of calculation steps to determined the barycenter of the picture. For example, if the object picture is comprised of 480×512 pixels in 16 gray levels, computation must be executed for about $4 \times 10^6$ data. Therefore, to be practical, the original picture is once subjected to binarization process, and then the barycenter is calculated according to the binarized picture. Even if such a provisional treatment is adopted, the computation must be undertaken for each of about $2.5 \times 10^5$ points contained in the picture comprised of 480×512 pixels. In the conventional rangefinding/autofocusing device of the triangulation type, the computation is quite complicated to determine the picture barycenter, thereby causing one problem that a costly processor would be required to execute fast computation.

The conventional rangefinding/autofocusing device of the triangulation type has another problem such that an object cannot be automatically discriminated from a background in order to effect selective rangefinding and autofocusing. Therefore, in the conventional device, the operator has to manually align a reference or finding mark to an object, and then the rangefinding and the autofocusing are effected.

SUMMARY OF THE INVENTION

An object of the present invention is to instantly and efficiently determine a barycenter of a target picture. Another object of the present invention is to automatically recognize a target. The inventive rangefinding/autofocusing device utilizes a joint transform correlator of the Fourier correlation optical system which treats a coherent light. The device includes input image forming means comprised of a pair of imaging or focusing lens systems, a lens driving mechanism for displacing the pair of lens systems in parallel manner along an optical axis, recording means for optically recording respective input images of an object, formed by the pair of focusing lens systems, and displaying means for displaying concurrently the pair of recorded input images in an offset relation from each other. The joint transform correlator provided in the device processes the displayed input images to form on its correlation plane at least a pair of correlation peaks representative of a correlation coefficient of the input image pair. A camera or a photodetector is disposed along the correlation plane to detect the correlation peaks. A calculation unit is provided to measure an interval between the detected correlation peaks and to calculate a distance between the focusing lens system pair and the object based on triangulation according to the measured correlation peak interval so as to determine a just-focus spacing between the focusing lens system pair and the input image recording means according to the calculated distance in order to establish a focused condition. A feedback mechanism operates according to the determined spacing to control the lens driving mechanism to shift the lens system pair along the optical axis.

By such construction, a barycenter value of the recorded input image can be calculated instantly in terms of the correlation peak interval utilizing the simple calculation unit or processor to thereby effect fast rangefing and autofocusing.

Further, the input image forming means may include a spatial light modulator of the electrically addressed type for temporarily displaying a reference image stored provisionally in an image memory, an additional image forming lens system for projecting the displayed reference image onto the input image recording means, so that the displaying means concurrently displays the recorded reference image and the recorded input reference image pair in an offset relation from each other. The joint transform correlator processes the displayed images to automatically recognize the object to thereby effect selective or discriminative rangefinding and autofocusing according to the reference image.

In the inventive rangefinding/autofocusing device of the joint transform correlation type, the focusing lens system pair, the input image recording means and the input image displaying means can function cooperatively to input the object image pair into the subsequent joint transform correlator while reserving object distance information in the form of the offset between the pair of object images based on the triangulation. The pair of input images have a quite similar configuration with each other though depending on a shape of the object unless the object is unusually set closely to the imaging lens system. Accordingly, the joint transform correlator treats one of the input image pair as a reference image and treats the other as a correlated image so as to produce correlation peaks therebetween. Since the joint transform correlator is of the shift variable type, an interval of the produced correlation peaks represents an offset between barycenters of the reference image and the correlated image, i.e., between the pair of input images.

As will be described later in detail, the calculation unit can carry out rather simple computation based on the offset between the barycenters of the input image pair to calculate the distance of the object from the input image recording means based on the triangulation. Further, the calculation unit can calculate quickly a correct spacing between the focusing lens system and the input image recording means in order to exactly focus the object onto the recording means according to the calculated distance of the object and the known focal length of the lens system. Lastly, the lens driving mechanism is operated to drive the lens system pair relative to the recording means according to the calculated spacing to thereby establish the focused or matched condition.

Preferably, the input image forming means includes the spatial light modulator of the electrically addressed type for momentarily displaying a reference image stored in a memory image, the additional focusing lens system for projecting the displayed reference image onto the input image recording means. The displaying means operates for displaying concurrently the recorded reference image and the recorded input image pair in a given offset relation to each other. These reference and input images are applied to an input plane of the joint transform correlator to obtain the correlation therebetween to effect selective autofocusing for a particular input image of the object, which coincides with the reference image.

DETAILED DESCRIPTION OF PREFERRED EMBODIMENTS

Figure 1:
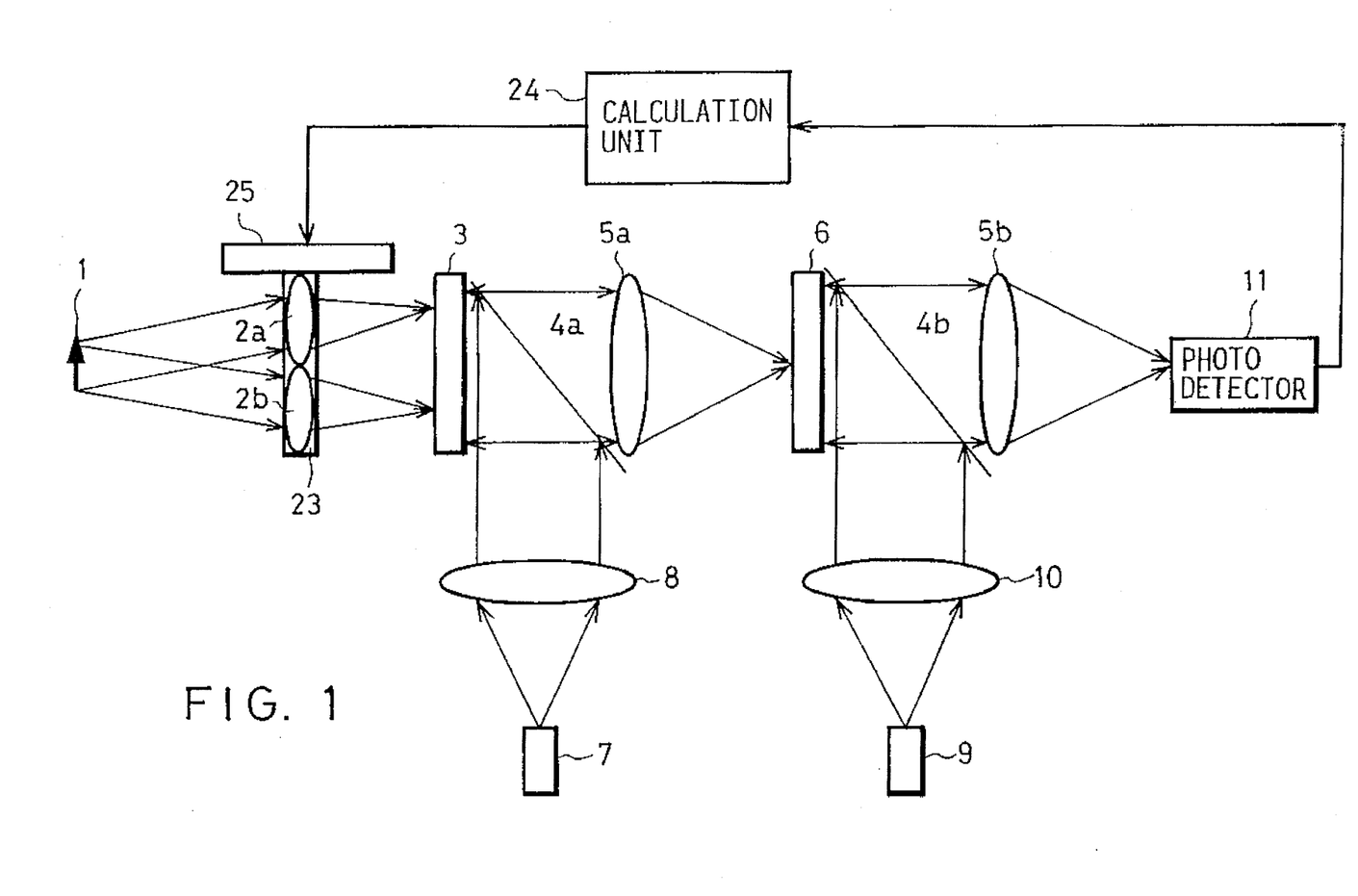
FIG. 1 is a basic structural diagram showing one embodiment of the inventive rangefinding/autofocusing device of the joint transform correlation type.

Embodiments of the invention will be described hereinafter in conjunction with the drawings. FIG. 1 is a basic structural diagram showing one embodiment of the inventive rangefinding/autofocusing device of the joint transform correlation type. The device comprises a pair of first and second focusing lenses 2a, 2b for imaging an object 1, a first spatial light modulator 3 of the optically addressed type, a first polarizing beam splitter 4a, a second polarizing beam splitter 4b, a first Fourier transform lens 5a, a second Fourier transform lens 5b, a second spatial light modulator 6 of the optically addressed type, a first coherent light source 7, a first collimator lens 8, a second coherent light source 9, a second collimator lens 10, a photodetector 11, a focusing lens holder 23, a calculation unit 24, and a focusing lens driving mechanism 25. In this embodiment, a joint transform correlator is composed of the first spatial light modulator 3, first polarizing beam splitter 4a, second polarizing beam splitter 4b, first Fourier transform lens 5a, second Fourier transform lens 5b, second spatial light modulator 6, first coherent light source 7, first collimator lens 8, second coherent light source 9, second collimator lens 10 and photodetector 11. The first and second focusing lenses 2a, 2b and the lens holder 23 constitute a pair of focusing lens systems in input image forming means. The lens driving mechanism 25 is operated for driving the pair of lens systems 2a, 2b in parallel to each other along an optical axis. The first spatial light modulator 3 of the optically addressed type constitutes input image recording means for recording a pair of input images of the object focused by the lens systems, and also constitutes input image displaying means for displaying concurrently the recorded input images in an offset manner with each other. The calculation unit 24 operates to measure an interval between correlation peaks representative of a correction coefficient of the input image pair, which is detected by the photodetector 11 or camera disposed along a correlation plane of the Fourier joint correlator. The calculation unit 24 further calculates a distance between the focusing lens system and the object 1, and also calculates a correct spacing needed for autofocusing between the focusing lens system 2a, 2b and the recording means in the form of the first spatial light modulator 3. As understood from FIG. 1, this embodiment includes a feedback mechanism for controlling the lens driving mechanism 25 to drive the focusing lenses 2a, 2b in parallel with each other along the optical axis according to the calculated correct spacing.

The first and second focusing lenses 2a, 2b are coupled with each other and supported in the lens holder 23. This lens holder 23 is displaced by the driving mechanism 25 relative to a recording plane of the first optical light modulator 3 in the axial or vertical direction according to a control signal fed from the calculation unit 24. In this embodiment, the first and second spatial light modulators 3, 6 of the optically addressed type are composed of a reflection type modulator such as a liquid crystal light valve. Otherwise, the spatial light modulator may be composed of a transmission type modulator utilizing BSO($Bi_{12}SiO_{20}$) single crystal, so-called "Pockels Readout Optical Modulator". The first spatial light modulator 3 and the second spatial light modulator 6 are disposed, respectively, along front and rear focal planes of the first Fourier transform lens 5a. Further, the same second spatial light modulator 6 and the photodetector 11 are disposed, respectively, along front and rear focal planes of the second Fourier transform lens 5b. Further in this embodiment, the photodetector 11 is comprised of a CCD (change coupled device) camera.

Figure 4:
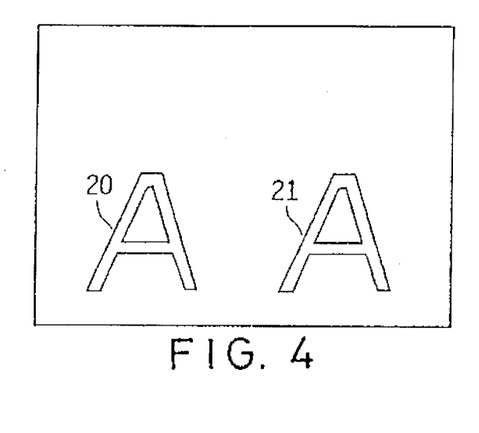
FIG. 4 shows one example of an input image pair recorded in the first spatial light modulator of the FIG. 1 embodiment.

Next, the description is given for the operation of the inventive rangefinding/autofocusing device of the joint transform correlation type. An incident light from the object 1 is collected and projected onto a record or write plane of the first spatial light modulator 3 of the optically addressed type by means of the first and second focusing lenses 2a, 2b. Each of the thus formed object images is recorded and displayed in the first modulator 3 in the substantially same configuration unless the formed object images are seriously out of focus. FIG. 4 shows an example of the object image pair recorded and displayed on the first modulator 3. Namely, one input image 20 formed by the first lens 2a and another input image 21 formed by the second lens 2b are recorded and displayed in offset relation from each other according to an object distance.

On the other hand, the coherent light emitted from the first light source 7 is expanded and converted into a parallel beam by the first collimator lens 8, and is then reflected by the first beam splitter 4a to irradiate reversely the first modulator 3 to thereby read out the recorded and displayed pair of input images 20, 21 to convert the same into corresponding coherent images. The thus obtained coherent images are Fourier-transformed by the first Fourier lens 5a to form a joint Fourier transform image of the input image pair 20 and 21, which is then recorded and displayed on the second spatial light modulator 6 of the optically addressed type in the form of an intensity distribution.

Figure 6:
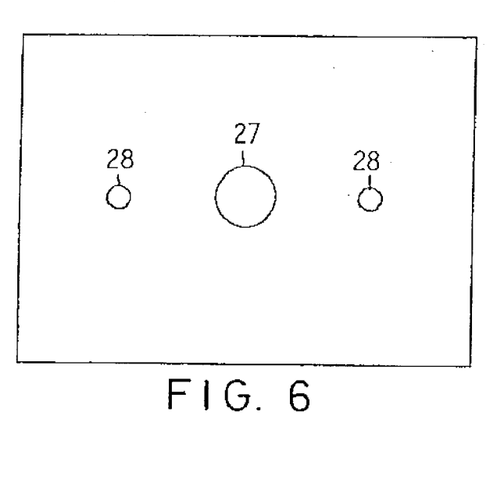
FIG. 6 shows one example of a correlation output in the FIG. 1 embodiment.

Further, another coherent light emitted from the second light source 9 is expanded and converted into a parallel beam, which is then reflected by the second beam splitter 4b to irradiate reversely the second modulator 6 to thereby read out the recorded intensity distribution of the joint Fourier transform image. The thus read intensity distribution is again Fourier-transformed by the second Fourier lens 5b to form an optical correlation function of the input image pair 20, 21 on a photoelectric conversion plane of the photodetector 11. FIG. 6 shows a configuration of the optical correlation function. As shown in the figure, the correlation function includes a pair of correlation peaks 28 representative of the correction coefficient of the input image pair 20, 21 and another peak 27 indicative of a DC bias component. Provided that the pair of correlation peaks 28 have an interval s therebetween, and that the pair of input images 20, 21 have barycenter coordinates of $(-a, 0)$ and $(a, 0)$, respectively, the following relation is held: $s=2a$. A half level width of the correlation peak is very narrow and sharp though, depending on whether the first and second modulators 3, 6 record a binarized image or a continuously gradated image and also depending on a shape of the input image. The interval s of the correlation peaks 28 corresponds to a coordinate difference between maximum values of the correlation peaks 28. Therefore, the interval s between the correlation peaks 28 is readily measured.

The correlation peak information of FIG. 6 is fed from the photodetector 11 of FIG. 1 to the calculation unit 24 to calculate the peak interval s. The calculation unit 24 further operates based on the correlation peak interval s to compute a distance Z from the object 1 to the first spatial light modulator 3, and a focally matched spacing δ between the first and second focusing lenses 2a, 2b and the first modulator 3. Moreover, the calculation unit 24 feeds a control signal effective to set up the matched spacing δ to the lens driving mechanism 25 so as to displace the lens holder 23 such that the object image is optimumly recorded in the correctly focused condition.

Figure 3:
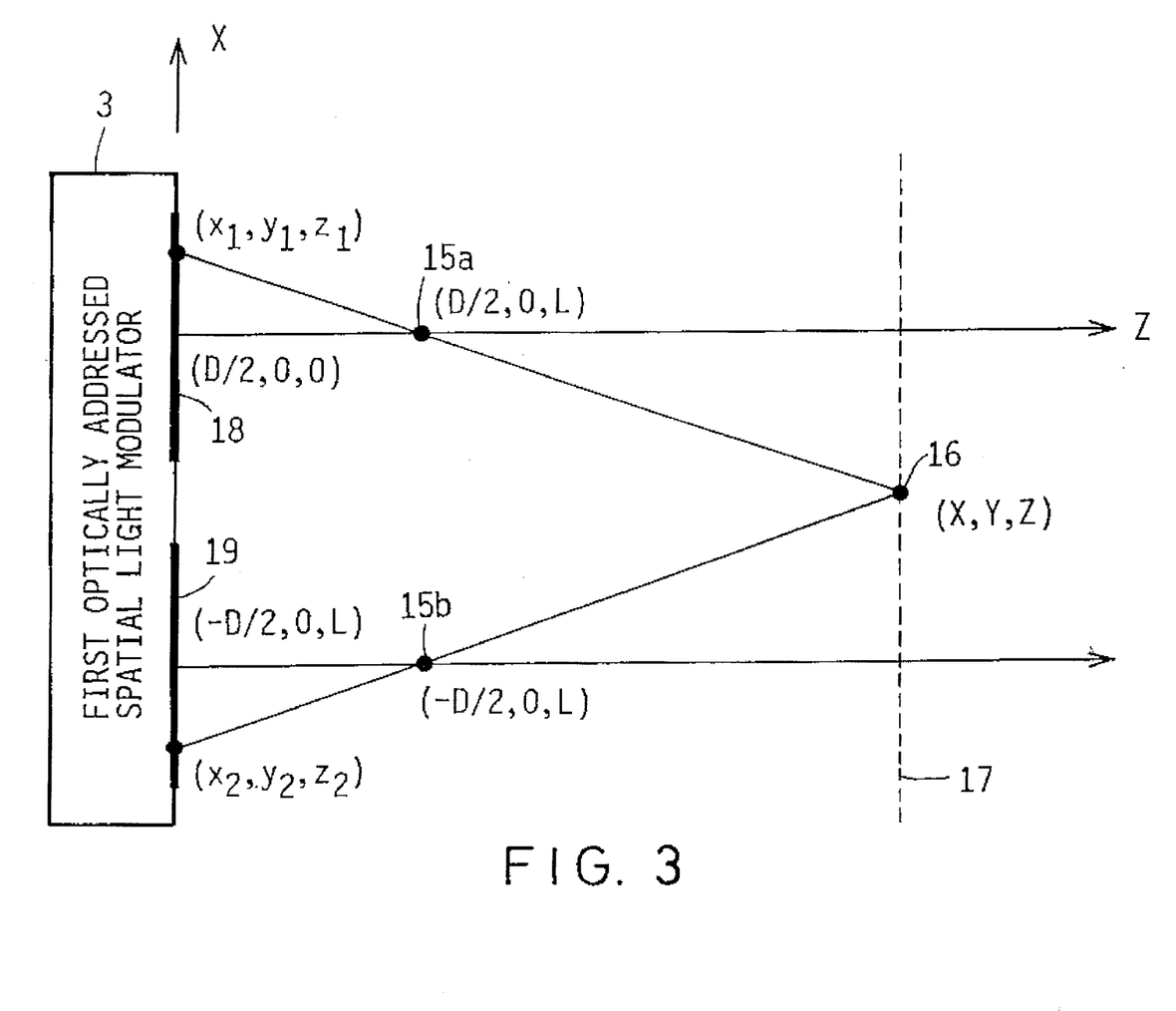
FIG. 3 is an illustrative diagram showing recording operation of an object image onto a first spatial light modulator of the optically addressed type in the FIG. 1 embodiment.

As described above, the inventive device of the joint transform correlation type has functions of autofocusing relative to an input plane of the joint transform correlator, and rangefinding of an object from the device. Next, the detailed description is given for the computation of the object distance Z and the just-focus spacing δ. FIG. 3 is a schematic diagram showing the image forming operation of an object in the FIG. 1 embodiment. The FIG. 3 diagram schematically illustrates the first spatial light modulator 3 of the optically addressed type, a center 15a of the first focusing lens, another center 15b of the second focusing lens, a center 16 of the object, a vertical object plane 17 (z=constant), a first image region 18, and a second image region 19. The center 15a of the first focusing lens has a coordinate value of (D/2, O, L). The center 15b of the second focusing lens has a coordinate value of (–D/2, O, L). A cross point is defined by a coordinate value of (D/2, O, O,) between a write plane of the modulator 3 and a normal line passing through the center 15a of the first focusing lens. Another cross point is defined by a coordinate value of (–D/2, O, O) between the same write plane and another normal line passing through the center 15b of the second focusing lens. The input image formed by the first focusing lens has a barycenter defined by a coordinate value of $(x_1, y_1, z_1)$. The other input image formed by the second focusing lens has a barycenter designated by a coordinate value of $(x_2, y_2, z_2)$. The barycenter of the object has a coordinate value of (X, Y, Z). Namely, the transverse span is set to D between the first and second focusing lenses. The axial distance is set to Z between the barycenter 16 of the object and the write plane of the first spatial light modulator 3. The coordinate X can take any value, however the coordinate X may be preferably set to $X \simeq O$. Further, the transverse span D is fixed between the pair of focusing lenses. In this case, $z_1=z_2=0$ is held. Further in general, $y_1=y_2 \simeq 0$ is held. However, in a certain pattern recognition application utilized in machine vision, $y_1=y_2=0$ is normally held. In such a case, as well known as the stereoscopy theory, the distance Z is given by the following relation (1) between the object center 16 and the write plane of the first spatial light modulator 3.

$$Z=L/[1-D/(x_2-x_1)] \quad (1)$$

The above relation (1) is satisfied without regard to whether the input image pair is focused on the first modulator 3 correctly or not. Namely, the object distance Z is readily calculated when the variables L and $x_2-x_1$ are fixed. The value $x_2-x_1$ is never less than the value D, and $x_2-x_1=D$ is reached when $Z=\infty$.

On the other hand, the first and second focusing lenses 2a, 2b have the same focal length f. Provided that in the just-focus state, v denotes a distance between the respective centers 15a, 15b of the first and second focusing lenses and the respective barycenters of the corresponding input images, and w denotes a distance between the respective centers 15a, 15b of the first and second focusing lenses and the object center 16, the following lens formula (2) is established in well known manner.

$$(1/w)+(1/v)=1/f \quad (2)$$

Normally, $Z \gg 1$ is held so that the lens formula (2) is approximated as follows by replacing the distance v with a just-focus spacing b between the respective lens centers 15a, 15b and the write plane of the first spatial light modulator.

$$1/(Z-b)+(1/b)=1/f \quad (3)$$

Thus, the just length or spacing b between the focusing lens pair and the write plane of the first modulator is represented as follows according to the relations (1) and (3).

$$b=(Z/2) [1-(1-4f/Z)^{1/2}] \quad (4)$$

In more direct form, the just focus spacing b is represented as follows with using L and $x_2-x_1$ in place of Z.

$$b=[L/2 \{1-D/(x_2-x_1)\}] \times [1-\{1-4f(1-D/(x_2-x_1))/L\}^{1/2}]$$

Then, as described before, the offset $x_2-x_1$ between the input image pair is calculated by the interval δ of the correlated peaks as $\delta=x_2-x_1$. Further, the current spacing L between the respective focusing lenses 2a, 2b and the first spatial light modulator 3 is precisely measured with respect to a given reference position, for example, the just focus position for an infinitely far object. Since the transverse span D between the pair of lense centers 15a and 15b is set precisely to a known value and the focal length f of the first and second focusing lenses 2a, 2b is known, the just-focus spacing b is automatically calculated for object 1 according to the relation (5). Therefore, a spacing error can be calculated in terms of L-b where L denotes the current spacing between the focusing lens pair 2a, 2b and the first modulator 3 and b denotes the just-focus spacing therebetween. Thereafter, the focusing lens pair 2a, 2b is displaced by the error L-b to thereby correctly focus each input image onto the write or recording plane of the first modulator 3.

Even in case of $y_1=y_2\neq 0$, the position of the correlation peaks representative of a correlation coefficient between the input image pair is identical to that of the correlation peaks 28 of FIG. 6 according to the shift-invariability of Fourier transform as long as $y_1$ and $y_2$ are not far deviated from the first and second image regions 18 and 19, respectively. In this regard, the photodetector 11 of the FIG. 1 embodiment may be composed of a linear photosensor having a linear photoelectric conversion zone aligned to cover the pair of correlation peaks, in place of the CCD camera and other pickup tubes. The linear photosensor can more quickly detect the correlation peak position as compared with a planar image sensor, such as a CCD camera.

Figure 9:
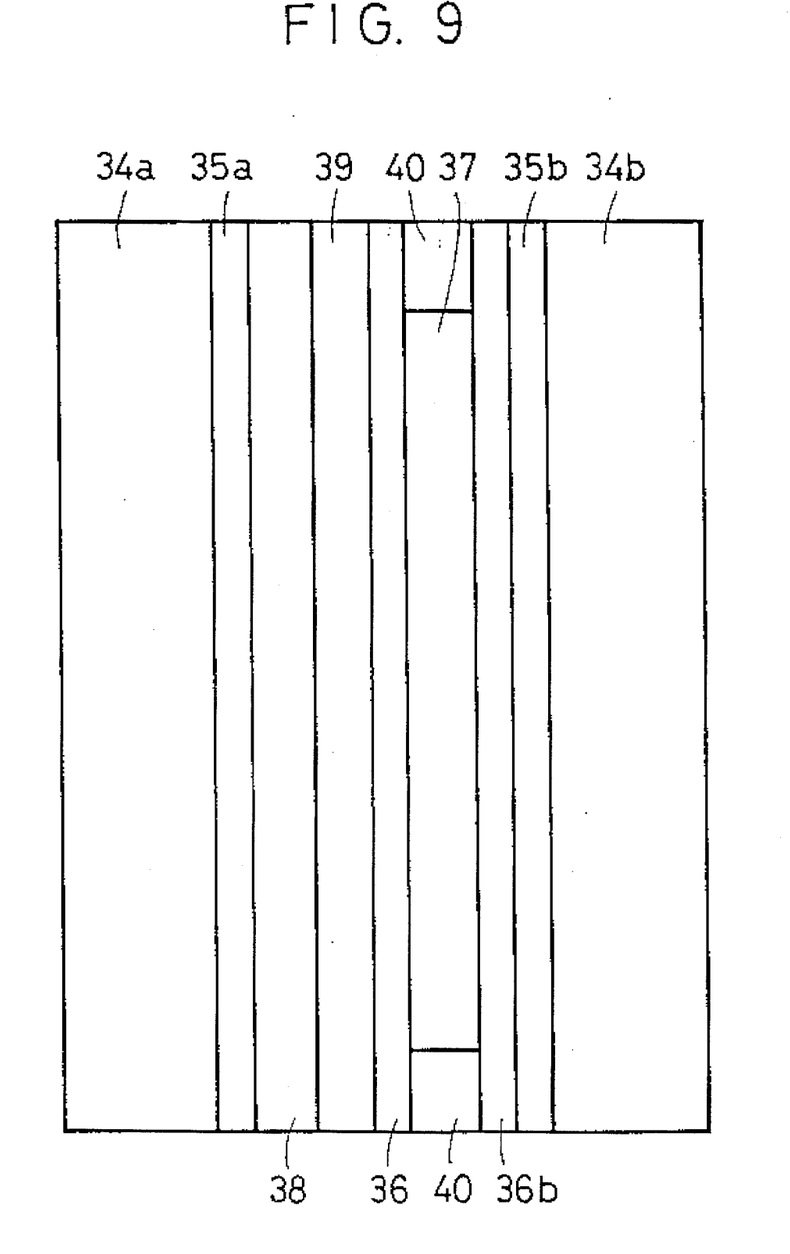
FIG. 9 is a sectional diagram showing one example of a ferroelectric liquid crystal light valve of the optically addressed type utilized in the inventive device.

Next, the description is given for the spatial light modulator of the optically addressed type used in the rangefinding/autofocusing device of the joint transform correlation type. FIG. 9 is a sectional diagram showing the spatial light modulator in the form of a ferroelectric liquid crystal light valve of the optically addressed type used in the embodiment of the present invention. A pair of transparent substrates 34a, 34b are composed of glass or plastic, and are coupled to each other to sandwich therebetween a liquid crystal. The respective substrates 34a, 34b are formed, on their faces, transparent electrode layers 35a, 35b and alignment layers 36a, 36b which are composed of silicon monooxide applied by oblique evaporation by an angle of 75°–85° with respect to the normal of the transparent substrate. The pair of transparent substrates 34a, 34b are opposed to each other through a controlled gap so as to sandwich a ferroelectric liquid crystal 37 while the alignment layers 36a, 36b are faced with each other.

Further, a photoconductive layer 38 and a dielectric mirror 39 are laminated on the transparent substrate 34a of the writing side, under the aligument layer 36a. The photoconductive layer 38 may be composed of hydrogenated amorphous silicon of the intrinsic type, or of the schottoky barrier type. In this embodiment, the hydrogenated amorphous silicon of the intrinsic type is utilized as the photoconductive layer 38. An anti-reflection coating is preferably applied over cell surfaces of the writing side transparent substrate 34a and the reading side transparent substrate 34b.

Next, the description is given for methods of initializing the ferroelectric liquid crystal light valve having the above described construction. A first method is such that the writing side of the light valve is entirely irradiated by an incident light while the pair of transparent electrode layers 35a, 35b are applied with a voltage sufficiently higher than a maximum value of an operating threshold voltage of a bright state, in the form of a pulse voltage, or a DC bias voltage, or a modulated DC bias voltage superposed with an AC voltage of 100 Hz–50 kHz, thereby orienting the ferroelectric liquid crystal molecules in one of bistable states to memorize the same. A second method is such that the pair of transparent electrode layers 35a and 35b are applied with a voltage sufficiently higher than an operating threshold voltage of a dark state, in the form of a pulse voltage, a DC bias voltage or a modulated DC bias voltage superposed with an AC voltage of 100 Hz–50 kHz, thereby orienting the ferroelectric liquid crystal molecules in another bistable state to memorize the same.

Further, the description is given for the operation after initializing the ferroelectric liquid crystal light valve. The pair of transparent electrode layers 35a, 35b are applied with an opposite polarity voltage lower than a minimum value of the dark state operating threshold voltage and higher than a maximum value of the bright state operating threshold voltage, in the form of a pulse voltage, a DC bias voltage, or a modulated DC bias voltage superposed with an AC voltage of 100 Hz–50 kHz, while a laser beam is irradiated to optically write an image, for example, a joint Fourier transform image of a coherent two-dimensional image as described in the FIG. 1 embodiment. An electronic carrier is generated in a region of the photoconductive layer 38 irradiated by the laser light. The generated carrier drifts in an electric field direction by the DC bias voltage. Consequently, the operating threshold voltage lowers so that the region irradiated by the laser light is applied with a bias voltage of the opposite polarity over the operating threshold voltage. Accordingly, the ferroelectric liquid crystal molecules are reversed due to inversion of spontaneous dipole moment to thereby switch to the other bistable state so that the image is memorized in the binarized form.

The binarized and memorized image is irradiated by a linearly polarized reading light having a polarization axis aligned in parallel to (or orthogonal to) the orientation direction of the liquid crystal. By this, the memorized image is read out in a positive or negative form through an analyzer having a polarization axis arranged orthogonal to (or parallel to) a polarization direction of a reflected light from the dielectric mirror 39. In the present embodiment, the first and second polarization beam splitters 4a, 4b are used as the analyzer.

Alternatively, the ferroelectric liquid crystal light valve of the optically addressed type may display a continuously gradated image if the dielectric mirror 39 has a transmission rate sufficient to enable the reading light to influence the photoconductive layer 38 or if the dielectric mirror 39 is eliminated. Namely, the light valve is operated by applying continuously between the transparent electrode layers 35a, 35b a pulse voltage effective to switch alternatively the voltage characteristic of the photoconductive layer 38 in positive and negative polarities. In this case, a DC bias voltage is superposed between the transparent electrode layers 35a, 35b such that the magnitude or pulse height of the positive voltage is set greater than that of the negative voltage. Further, the reading light has a predetermined polarization direction effective to set the read image in the positive form. Thus, the light valve operates to erase the input image in response to the application of the positive voltage, and to write and read the input image in response to the application of the negative voltage. Such an asymmetric pulse voltage is utilized so that the ferroelectric liquid crystal 37 is applied with the writing voltage (negative voltage) proportional to light intensity irradiated onto the photoconductive layer 38 during the writing operation. Thus, a repulsive force is generated in the ferroelectric liquid crystal molecules according to the writing light, while a relaxation force is also generated due to the asymmetricity of the applied voltage so as to restore the ferroelectric liquid crystal molecule to the initial stable state. Accordingly, in this driving method of the light valve, the intensity of the reading light increases in proportion to that of the writing light during the writing operation, thereafter diminishing as time passes. This diminishing time is determined by a relaxation time of the ferroelectric liquid crystal molecule, hence a frequency of the asymmetric pulse voltage is preferably set more than 100 Hz though depending on a ferroelectric liquid crystal material used in the light valve. By adopting the above described driving method, the ferroelectric liquid crystal light valve of the optically writable type can write an input image or a joint Fourier transform image in the continuous gradation on real time basis.

In the FIG. 1 embodiment of the rangefinding/autofocusing device of the joint transform correlation type, for example, the focal length of the first and second focusing lenses 2a, 2b is set to 30 mm, a span between the centers of these lenses is set to 10 mm, and the spacing or gap between the center of these lenses and the first spatial light modulator 3 is set to 40 mm. In this case, there are obtained a pair of correlation peaks having an interval of 10.7 mm. The relation (1) is used to calculate the distance between the object 1 and the first modulator 3 to 611 mm according to the measured correlation peak interval. Further, the relation (4) is calculated so that the spacing between the focusing lens pair 2a, 2b and the first modulator 3 should be adjusted to 31.6 mm in order to just focus the object 1 on the first modulator 3. Then, the focusing lens pair 2a, 2b is shifted axially by the driving mechanism 25 to correct the spacing according to the calculated result to thereby achieve the just-focus state. Practically, the just-focus state may not be established by one sequence of the computation due to a measurement error and an approximated calculation. Therefore, the cycle of measurement, computation and adjustment is repeatedly carrier out to effect precise object focusing. The ferroelectric liquid crystal light valve of the optically writable type is utilized as the first and second spatial light modulators 3, 6 to operate the inventive rangefinding/autofocusing device at speed of more than 30 Hz and typically at more than 100 Hz with a simplified calculation process, thereby realizing the fast rangefinding and autofocusing substantially on a real time basis. With regard to the measurement accuracy, though depending on focal length of the focusing lens, and the type of the photodetector 11 used, the relative error of the rangefinding is on the order of 5% and the relative error of the focus point is on the order of 1%.

Figure 8:
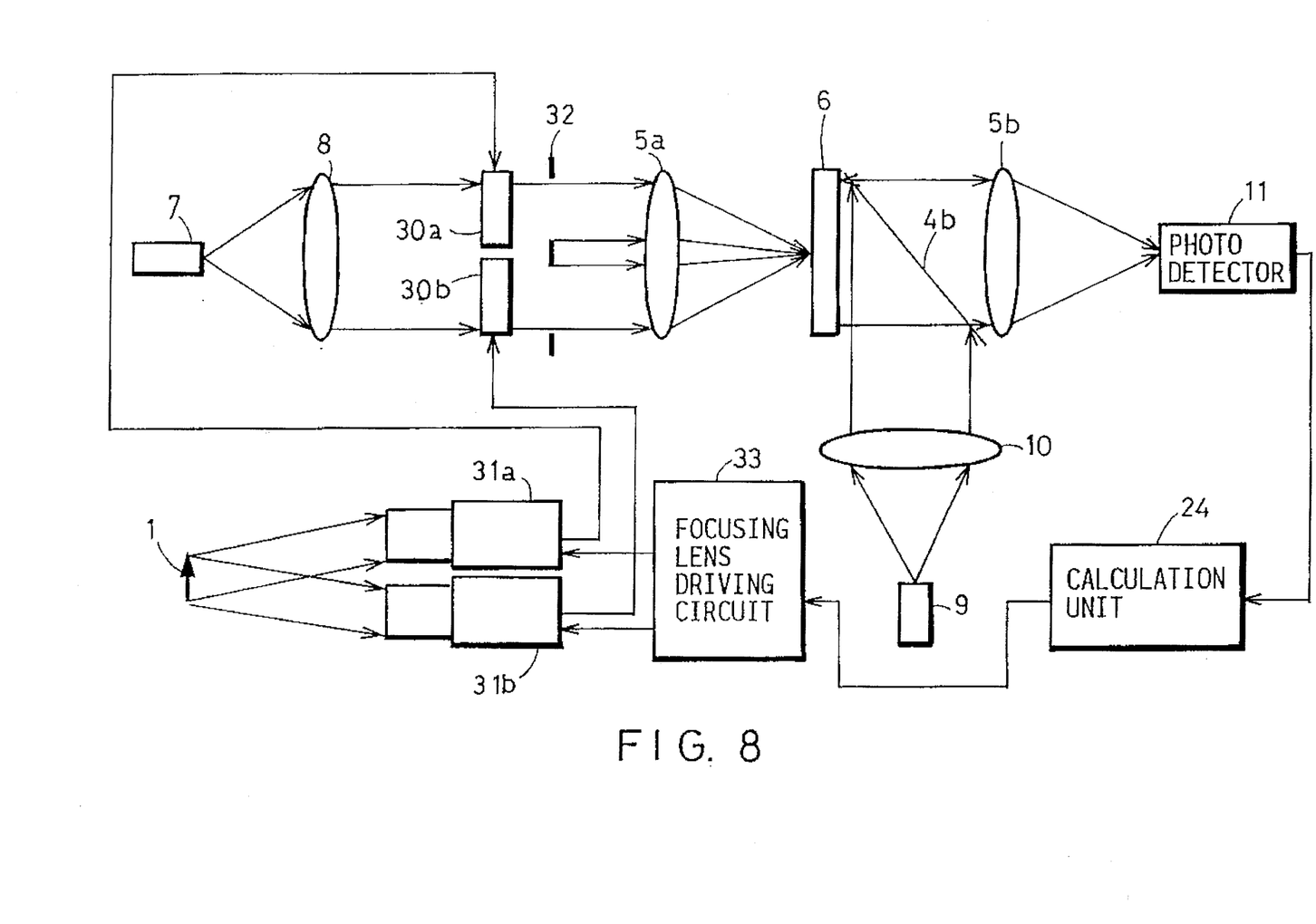
FIG. 8 is a basic structural diagram showing still another embodiment of the inventive rangefinding/autofocusing device.

FIG. 8 shows another embodiment of the inventive rangefinding/autofocusing device of the joint transform correlation type. This embodiment utilizes a CCD camera and a liquid crystal television as the input image forming means. This embodiment includes a first liquid crystal television 30a, a second liquid crystal television 30b, a first CCD camera 31a, a second CCD camera 31b, a mask 32 and a focusing lens driving circuit 33. The input image forming means is comprised of the first liquid crystal television 30a, second liquid crystal television 30b, first CCD camera 31a and second CCD camera 31b. The driving circuit 33 drives a lens displacement mechanism contained in the first and second CCD cameras 31a, 31b. The mask 32 has a function to block unnecessary light from the first and second liquid crystal televisions 30a, 30b. For better understanding, the same component is denoted by the same reference numeral as that of the FIG. 1 embodiment.

The first and second CCD cameras 31a and 31b are mounted movably on a common camera table so that respective normal lines from each of focusing lenses to the corresponding CCD photoelectric conversion face are always oriented in the same direction. Further, the span between the centers of the focusing lens pair is fixed. Though not shown in the figure, the device includes an amplifier for amplifying a video signal from these CCD cameras, and a liquid crystal television driving circuit for activating and driving the first and second televisions 30a, 30b according to the amplified video signal. The centers of the respective focusing lenses of the first and second CCD cameras 31a, 31b are initially set to the same spacing from the respective CCD photoelectric conversion face.

In similar manner as described in conjunction with FIG. 3, this embodiment measures an offset between one barycenter of a first input image of the object 1 taken by the first CCD camera 31a and displayed on the first liquid crystal television 30a, and another barycenter of a second input image of the same object 1 taken separately by the second CCD camera 31b and displayed on the second liquid crystal television 30b. The offset between the barycenters is a function of distances from the object 1 to respective CCD photoelectric conversion faces of the first and second CCD cameras 31a, 31b, spacings between respective centers of the focusing lenses of the first and second CCD cameras 31a, 31b and corresponding CCD photoelectric conversion faces of these cameras, and a span between the centers of the respective focusing lenses of the first and second CCD cameras 31a, 31b. Therefore, in similar manner, the relations (1), (2), (3) and (4) are utilized to calculate the distance from the object 1 to the respective one of the CCD photoelectric conversion faces of the first and second CCD cameras 31a, 31b, and the just-focus spacing between the center of respective focusing lenses of the first and second CCD cameras 31a, 31b and the CCD photoelectric conversion face of these CCD cameras.

Next, the operation of the FIG. 8 embodiment is described. The first coherent light source 7 such as a semiconductor laser emits a coherent light, which is expanded by the first collimator lens 8 and is converted into a parallel light beam, thereby illuminating the first and second liquid crystal televisions 30a, 30b. The first and second liquid crystal televisions 30a, 30b respectively display input images of the same object 1 by means of the first and second CCD cameras 31a, 31b. Therefore, the coherent light illuminates the first and second liquid crystal televisions 30a, 30b of the transmission type to convert the respective input images into corresponding coherent images. Only a display region of the coherent images is projected onto the first Fourier transform lens 5a through the mask 32. Then, these coherent images are concurrently Fourier-transformed by the first Fourier transform lens 5a to thereby illuminate the second spatial light modulator 6 of the optically addressed type. Then, correlation process is undertaken to detect correlation peaks by the photodetector 11 in a manner similar to the FIG. 1 embodiment. The calculation unit 24 operates according to the interval between the correlation peaks to calculate the object distance and the just-focus spacing. The focusing lens driving circuit 33 is activated by a signal corresponding to the calculated just-focus spacing to displace the focusing lenses of the first and second CCD cameras 31a, 31b so that the object input image is correctly focused on the CCD photoelectric conversion faces.

As described above, the present embodiment utilizes object image input means comprised of practical elements such as the CCD camera and the liquid crystal television to thereby facilitate the assembling of the inventive device. Further, the CCD camera has a photosensitivity much higher than that of the regular liquid crystal light valve of the optically writable type, and has a wider dynamic range, thereby advantageously simplifying an illuminating mechanism of the input object. However, the liquid crystal television utilized as input image displaying means operates only at 30 Hz of frame rate or video rate. Therefore, the present embodiment may not effect rangefinding and autofocusing for an object which moves fast over the operating speed of the television.

Figure 2:
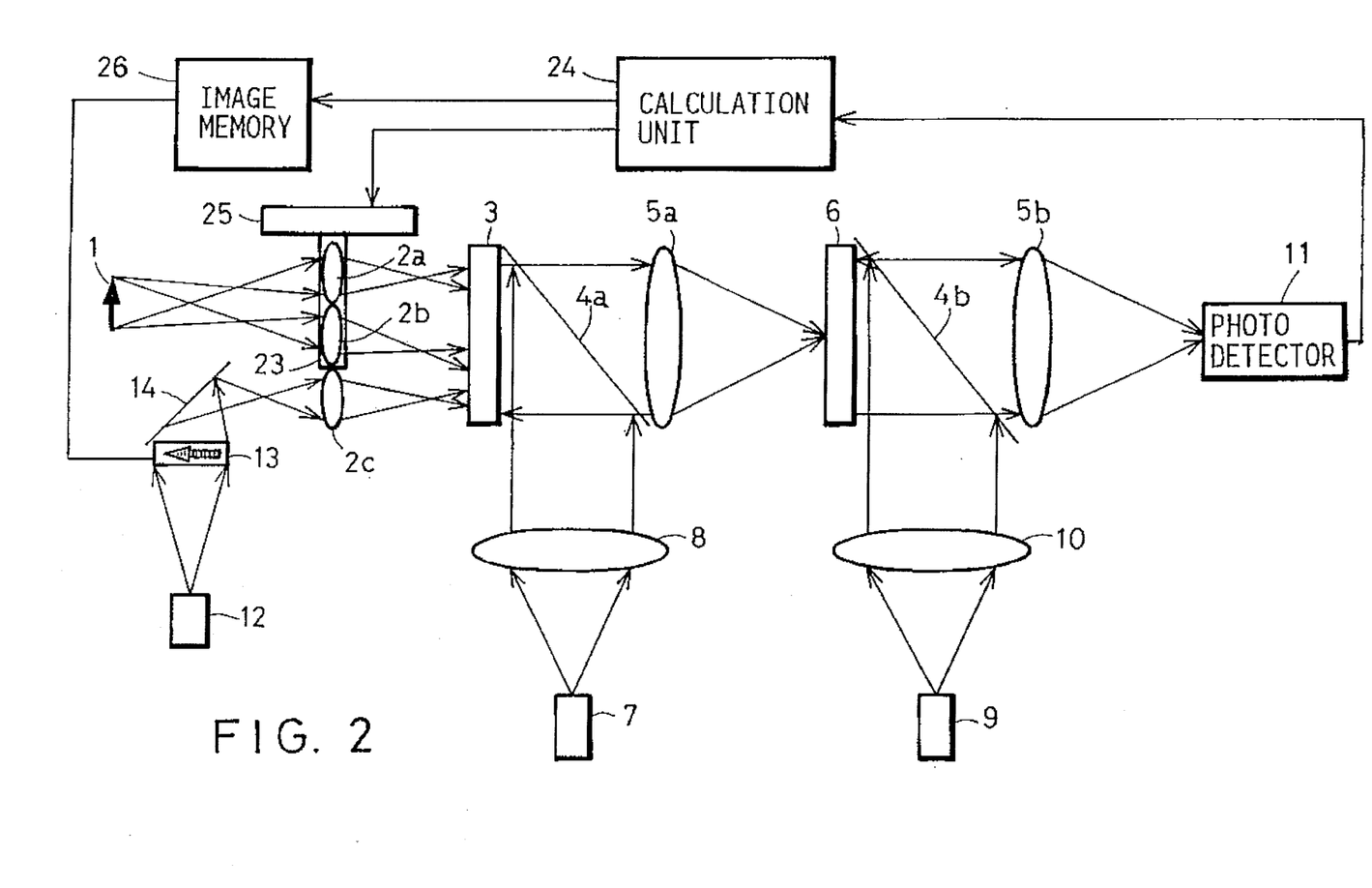
FIG. 2 is a basic structural diagram showing another embodiment of the inventive device provided with a pattern recognition function.

The above described embodiments cannot recognize a particular object from an input image, and therefore cannot effect selective rangefinding/autofocusing. Normally, the first and second focusing lens pair 2a, 2b of the FIG. 1 embodiment or the first and second CCD camera pair 31a, 31b of the FIG. 8 embodiment may form an input image which contains a background as well as an object. Therefore, it is necessary to manually direct the focusing lens to the object 1. In view of this, FIG. 2 shows an modified embodiment capable of recognizing a particular object from the background in order to effect selective rangefinding/autofocusing. This device includes a third focusing lens 2c, an incoherent light source 12, an electrically writable spatial light modulator 13, a mirror 14 and an image memory 26. Further, the same component is denoted by the same reference numeral as that of the FIG. 1 embodiment in order for better understanding. The FIG. 2 embodiment is different from the FIG. 1 embodiment in that there is added reference image input means comprised of the image memory 26, incoherent light source 12, electrically writable spatial light modulator 13, mirror 14, third focusing lens 2c and first spatial light modulator 3 of the optically writable type.

The image memory 26 stores digital reference image information, which is retrieved and converted by a D/A converter (not shown in the figure) into corresponding analog information. A driving circuit of the modulator 13 is activated according to the analog information to display the reference image on the modulator 13. Alternatively, a digital driving circuit may be adopted to retrieve the reference image information to display the reference image on the modulator 13 without using D/A conversion. The electrically writable spatial light modulator 13 may be comprised of a liquid crystal television, a photomagnetic spatial light modulator or a photoelectric spatial light modulator utilizing ceramics. The liquid crystal television is adopted in this embodiment.

Next, an incoherent light emitted from the light source 12 illuminates the reference image displayed on the spatial modulator 13 to read out the same, which is deflected by the mirror 14 and is then focused, recorded and displayed on the writing face of the first spatial light modulator 3 of the optically addressed type, by means of the third focusing lens 2c. Though not shown in the figure, the incoherent light from the source 12 is converted into a parallel beam by a collimator lens and is further uniformly processed by a diffusion plate. The mirror 14 may be eliminated if it is not necessary to reflect the light path. Further, it is desirable to arrange respective centers of the first, second and third focusing lenses not to align along the same line.

Figure 5:
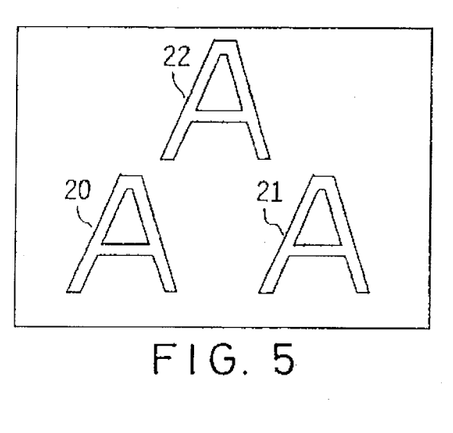
FIG. 5 shows one example of input and reference images recorded on a first spatial modulator of the FIG. 2 embodiment.

FIG. 5 shows one example of the input image recorded and displayed on the first modulator 3. This configuration includes an input image 20 formed by the first focusing lens 2a, another input image formed by the second focusing lens 2b, and a further input image formed by the third focusing lens 2c. Namely, the input images 20, 21 correspond to the object 1 and the input image 22 corresponds to the reference image. As shown, these input images 20, 21 and 22 are arranged such that their barycenters are not positioned on the same line. The reference input image 22 is just-focused normally, while the object input images 20, 21 are not formed in the just focused state initially, as described before. Therefore in general, the object input images 20, 21 are different from the reference input image 22. Accordingly as shown in FIG. 6, in the initial state, there only appear intense correlation peaks associated to the object input images 20, 21. As shown in FIG. 3, the calculation is carried out based on an interval between the correlation peaks to determine the distance Z between the center 16 of the object and the write face of the first modulator 3 and to determine the just-focus spacing b between the centers 15a, 15b of the first and second focusing lenses, and the writing face of the first modulator 3. Then, the first and second focusing lenses 2a, 2b are displaced to place the object input images 20, 21 shown in FIG. 5 in the just-focus state. Concurrently, the magnification $\gamma$ of the object input images 20, 21 is computed as follows.

$$\gamma = b/(Z-b) \qquad (6)$$

On the other hand, provided that p denotes a multiplication factor of the reference image displayed on the modulator 13 relative to an original shape, and q denotes a magnification factor of the reference image by the third focusing lens 2c, the multiplication factor p is adjusted to satisfy the following relation.

$$P = \gamma/q \qquad (7)$$

Figure 7:
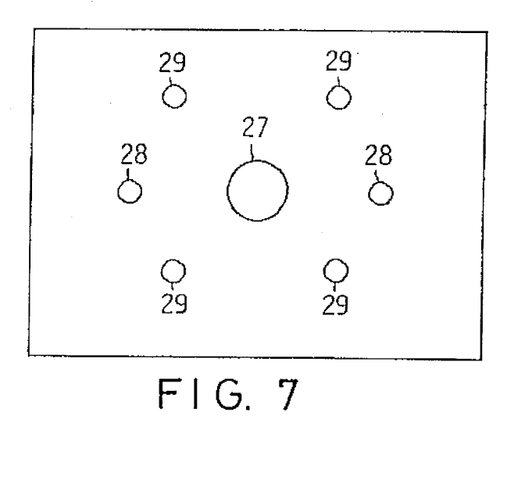
FIG. 7 shows one example of a correlation output in the FIG. 2 embodiment.

Consequently, the respective input images become the same size on the first modulator 3 as shown in FIG. 5. Thus, three pairs of correlation outputs appear at this stage as shown in FIG. 7. This pattern contains correlation peaks 29 among the object and reference images used to determine a correlation between the reference image and the object. The correlation peaks include a correlation peak pair between the object image 20 and the reference image 22, and another correlation peak pair between the other object image 21 and the same reference image 22 shown in FIG. 5.

The calculation unit includes recognizing means for recognizing a target object depending on the correlation between the reference image and the object. In case that the correlation peak between the object and reference images exceeds a predetermined value, it is recognized that the focused object is a particular target one to be selected. On the other hand, if the correlation peak between the object and reference images is lower than the predetermined value, the displayed reference image is replaced by another one on the modulator 13 so as to select a particular reference image having the maximum correlation peak to thereby recognize the object 1 (inventive recognition method). Alternatively, in case that the correlation peak is lower than the pretermined value, the rangefinding/autofocusing device is manually displaced to direct to another object to thereby carry out the rangefinding/autofocusing again and to measure intensity of the correlation peak. Such process is repeatedly undertaken until the intensity of the correlation peak exceeds the predetermined value to thereby search a target object (inventive searching method), while holding a particular reference image.

In a more sophisticated form, the image memory 26 of the FIG. 2 embodiment is stored provisionally with positional information of individual objects corresponding to different reference images, while the position or attitude of the rangefinding/autofocusing device is monitored so as to facilitate the above described searching operation. Alternatively, the first and second focusing lens pair 2a, 2b is continuously swept over the displacement range so that the intensity of correlation peak 28 between the pair of object input images varies periodically according to a distribution of a bright point in the Z axis direction over a view field. The rangefinding and autofocusing are repeatedly carried out in a range where each correlation peak has a strong intensity while the displayed reference image is fixed on the modulator 13, thereby searching a target object which has a correlation peak exceeding the predetermined value with respect to the reference image. In this operation, all of the objects should be illuminated uniformly.

Moreover in the FIG. 2 embodiment, even if the center 16 of the object shown in FIG. 3 is deviated considerably in the X or Y axis directions from the origin point X=0 and Y=0, this deviation amount can be measured and corrected. Namely in FIG. 5, provided that the barycenter coordinate of the reference image 22 is given by $(x_3, y_3)$, the positions of the correlation peaks 29 between the object and reference images shown in FIG. 7 are given by: $(\pm(x_3-x_2)/2, \pm(y_3-y_2)/2)$, and $(\pm(x_3-x_1)/2, \pm(y_3-y_1)/2)$ where $x_3$ and $y_3$ denote constants. In case that the object center 16 (FIG. 3) is deviated in the X axis direction from X=0, provided that a center of the reading light beam for the first modulator 3 has a coordinate value (0, 0) in the section thereof perpendicular to the Z axis and $x_3=0$, the two pairs of correlation peaks appear asymmetrically with respect to the X axis since $|x_1|\approx|x_2|$. On the other hand, the object center 16 (FIG. 3) is set to x=0, $|x_1|=|x_2|$ and is held so that the two pairs of the correlation peaks appear symmetrically with respect to the X axis. Further in case that the object center 16 is deviated in the Y axis direction by a distance m from Y=0 and $y_3$=k(constant), the Y coordinates of the two pairs of the correlation peaks are given by $\pm(k-m)$, where $y_1=y_2=0$ is set if the object center 16 is positioned at Y=0. Consequently, the value of m can be measured to detect the deviation in the Y axis direction. Moreover, the rangefinding/autofocusing device is manually controlled such that the correction peaks appear symmetrically with respect to the X axis while the deviation m is made zero in the Y axis direction, thereby achieving the searching operation for a given object. A pickup device such as CCD camera may be utilized as a photodetector for the searching operation; however, it might be expedient to utilize a plurality of linear photodetectors arranged in the Y axis direction and having a photoelectric conversion area extending in the X axis direction in order to effect fast searching operation.

In the FIG. 2 embodiment of the inventive rangefinding/ autofocusing device, the input image forming means may be comprised, in combination, of a pickup device such as a CCD camera and an electrically writable spatial light modulator such as a liquid crystal television, as shown in FIG. 8. Further, in order to display the reference image on the first modulator in a given size by a multiplication factor associated with the magnification rate of the input image relative to the object, the magnification power of the third focusing lens may be variably adjusted while the multiplication factor of the reference image is fixed. Alternatively, both of the multiplication factor and the magnification factor may be varied.

Next, the description is given for display mode of the input image displayed on the input image forming means of the inventive rangefinding/autofocusing device of the joint transform correlation type. The input image forming means displays an input image and a reference image as shown in FIGS. 4 and 5. Then, the correlation process is effected to carry out rangefinding or autofocusing operation. In this operation, generally the displayed input images by first and second focusing lenses 2a, 2b may contain a background image besides an object image. In such case, if the correlation process is taken directly between these displayed images, the correlation peaks may contain much noise due to the background image, particularly between the input image formed by the first or second focusing lens and the reference image. In order to reduce the noise, the input image is binarized and displayed so as to obtain sharp correlation peaks. By such processing, emphasis is effected selectively for the image of the object 1 which has normally a greater light intensity than that of the background, while the background is eliminated by the binarizing process. In order to form such a binarized input image, a video output from the CCD cameras 31a, 31b of FIG. 8 is binarized by a binarizing circuit, and then the binarized images are displayed on the first liquid crystal televisions 30a, 30b. Alternatively, in the FIGS. 1 and 2 embodiments, the first spatial light modulator 3 of the optically writable type may be comprised of a binary recording device such as a photomagnetic spatial light modulator and a ferroelectric liquid crystal light valve. For example, the ferroelectric liquid crystal light valve of the optically addressed type can directly binarize the input image to display and record the same in manner as described in the FIG. 1 embodiment, thereby achieving accurate and fast pattern recognition.

However, generally the pattern recognition is applied to an input image having continuous gradation except for particular cases such as machine visioning and character recognition. In such case, there can be utilized the FIG. 3 ferroelectric liquid crystal light valve of the optically writable type in order to display the continuously gradated input image in manner similar to the FIG. 1 embodiment. The ferroelectric liquid crystal light valve displays the input image continuously gradated according to threshold characteristics determined by photosensitivity of the photoconductive layer and performance of the ferroelectric liquid crystal. Namely, a writing light having an intensity below a certain level is not recorded, while another light having an intensity greater than the certain level is recorded gradatively to display the intensified and continuously gradated input image. Accordingly, in the input image containing an object image, if the brightness of the background is below the threshold value, the background is not recorded and only the object image is displayed with the continuous gradation. Namely, as described above, the first ferroelectric liquid crystal light valve 3 can directly display the continuously gradated input image to thereby enable the pattern recognition with less noise, rather than utilizing a combination of the CCD camera and the liquid crystal television of TN mode in order to display the gradated display.

The inventive rangefinding/autofocusing device provided with the FIG. 2 pattern recognition function may utilize a pair of liquid crystal television and CCD camera show in FIG. 8 in order to input the image of object 1. In such case, the spatial light modulator 13 of the electrically addressed type is preferably disposed adjacent to the first and second liquid crystal televisions 30a, 30b of FIG. 8 in the same light beam so as to display the reference image.

As described above, the inventive rangefinding/autofocusing device utilizes a joint transform correlator of the Fourier correlation optical system using a coherent light. The input image forming means is comprised of a pair of imaging lenses, a lens driving mechanism for driving the imaging lenses along an optical axis, recording means for recording a pair of images of an input object formed by the imaging lenses, and displaying means for displaying the pair of recorded images in an offset relation from each other. The device further includes a camera or a photodetector disposed on a correlation plane for detecting correlation peaks corresponding to a correlation coefficient of the pair of displayed images so as to measure an interval between the correlation peaks, a calculation unit operative based on the measured interval to calculate a distance between the pair of imaging lenses and the input object to determine a correct spacing for just-focus between the pair of imaging lenses and the recording means, and a feedback mechanism operative based on the determined correct spacing for controlling the lens driving mechanism to displace the pair of imaging lenses axially, thereby effecting rangefinding/autofocusing of the object efficiently, accurately and immediately.

Further, in the modified inventive rangefinding/autofocusing device, the input image forming means includes a spatial light modulator of the electrically writable type for temporarily displaying a reference image provisionally stored in an image memory, an imaging lens system for imaging the displayed reference image on the recording means, and displaying means for displaying the recorded reference image simultaneously in an offset relation with the pair of input images. By such construction, the device can perform a recognition function to recognize an input object, a searching function to search a target object corresponding to a reference image, and a chasing function to chase a particular object corresponding to a given reference image. This device is quite advantageous in construction of a moving robot, a machine vision instrument, and a chasing measurement instrument. Further, the recorded object image may be automatically stored in the image memory to register the same as a reference image, thereby contributing significantly to an intelligent robotic system and an artificial intelligent system.

What is claimed is:

1. A rangefinding/autofocusing apparatus utilizing a joint transform correlator of a Fourier correlation optical system using a coherent light and having a correlation plane, the apparatus comprising:

input image forming means including a pair of imaging lens systems for imaging an object to form a pair of input images, a lens driving mechanism for driving the imaging lens systems in parallel manner, recording means for recording the input images, and displaying means for concurrently displaying the pair of the recorded input images in an offset relation relative to each other;

photodetecting means disposed on a correlation plane of a Fourier correlation optical system for detecting correlation peaks corresponding to a correlation coefficient of the pair of the displayed input images so as to measure an interval between the detected correlation peaks;

a calculation unit operative according to the measured interval of the correlation peaks for calculating a distance between the object and the pair of the imaging lens systems to determine a just-focus spacing between the recording means and the pair of the imaging lens systems; and a feedback mechanism operative according to the determined just-focus spacing for controlling the lens driving mechanism to shift the pair of the imaging lens systems in a parallel manner to thereby establish a just-focus state.

2. A rangefinding/autofocusing apparatus according to claim 1;

wherein the recording means and the displaying means are composed integrally of a spatial light modulator of an optically addressed type.

3. A rangefinding/autofocusing apparatus according to claim 1;

wherein the recording means comprises a pair of CCD cameras, and the displaying means comprises a pair of liquid crystal televisions.

4. A rangefinding/autofocusing apparatus according to claim 1;

wherein the photodetecting means comprises one pair or more of linear photodetectors.

5. A rangefinding/autofocusing apparatus according to claim 1;

wherein the input image forming means includes an image memory storing a reference image, a spatial light modulator of an electrically writable type for temporarily displaying the reference image, and an imaging lens system for imaging the displayed reference image on the recording means so that the reference image can be displayed on the displaying means simultaneously in an offset relation from the pair of the input images.

6. A rangefinding/autofocusing apparatus according to claim 5;

wherein the recording means comprises a CCD camera, and the displaying means comprises a liquid crystal television.

7. A rangefinding/autofocusing apparatus according to claim 5;

wherein the recording means and the displaying means are composed integrally of a spatial light modulator of an optically addressed type.

8. A rangefinding/autofocusing apparatus according to claim 7;

wherein the spatial light modulator comprises a ferroelectric liquid crystal light valve of an optically writable type composed of a laminate structure of a transparent substrate, a photoconductive layer of hydrogenized amorphous silicon, a light reflecting layer, a ferroelectric liquid crystal layer, an alignment film layer and an electrode layer for applying a voltage.

9. A rangefinding/autofocusing apparatus according to claim 8; wherein the input image forming means further includes means for driving the ferroelectric liquid crystal light valve such that the photoconductive layer is applied continuously and sequentially with pulse voltages of positive and negative polarities, and is concurrently applied with a given DC bias voltage effective to establish a monostable optical response in the ferroelectric liquid crystal layer.

10. A rangefinding/autofocusing apparatus according to claim 5; wherein the input image forming means further includes means for binarizing the pair of input images so that the pair of input images are displayed as a pair of binarized input images.

11. A rangefinding/autofocusing apparatus according to claim 5; wherein the input image forming means further includes means for changing a size of the reference image on the displaying means according to the calculated distance between the object and the pair of imaging lens systems.

12. A rangefinding/autofocusing apparatus utilizing a joint transform correlator of a Fourier correlation optical system using a coherent light and having a correlation plane, the apparatus comprising:

input image forming means for forming input images, the input image forming means including a pair of imaging lens systems for imaging an object to form a pair of input images, a lens driving mechanism for driving the imaging lens systems in parallel manner, an image memory for storing a reference image, a spatial light modulator for temporarily displaying the reference image, an imaging lens system for imaging the displayed reference image as another input image, recording means for recording the input images of the object and the input image of the reference image, and displaying means for concurrently displaying the pair of recorded input images of the object and the recorded input image of the reference image in an offset relation relative to each other;

photodetecting means disposed on a correlation plane of a Fourier correlation optical system for detecting correlation peaks corresponding to a correlation coefficient of the pair of displayed input images so as to measure an interval between the detected correlation peaks;

a calculation unit operative according to the measured interval of the correlation peaks for calculating a distance between the object and the pair of imaging lens systems to determine a just-focus spacing between the recording means and the pair of imaging lens systems; and a feedback mechanism operative according to the determined just-focus spacing for controlling the lens driving mechanism to shift the pair of imaging lens systems in a parallel manner to thereby establish a just-focus state.

13. A rangefinding/autofocusing apparatus according to claim 12; wherein the recording means comprises a CCD camera, and the displaying means comprises a liquid crystal television.

14. A rangefinding/autofocusing apparatus according to claim 12; wherein the recording means and the displaying means are composed integrally of an optically-addressable spatial light modulator.

15. A rangefinding/autofocusing apparatus according to claim 14; wherein the spatial light modulator comprises a optically-writable ferroelectric liquid crystal light valve composed of a laminate structure of a transparent substrate, a photoconductive layer of hydrogenized amorphous silicon, a light reflecting layer, a ferroelectric liquid crystal layer, an alignment film layer and an electrode layer for applying a voltage.

16. A rangefinding/autofocusing apparatus according to claim 15; wherein the input image forming means further includes means for driving the ferroelectric liquid crystal light valve such that the photoconductive layer is applied continuously and sequentially with pulse voltages of positive and negative polarities, and is concurrently applied with a given DC bias voltage effective to establish a monostable optical response in the ferroelectric liquid crystal layer.

17. A rangefinding/autofocusing apparatus according to claim 12; wherein the input image forming means further includes means for binarizing the pair of input images so that the pair of input images are displayed as a pair of binarized input images.

18. A rangefinding/autofocusing apparatus according to claim 12; further including means for changing a size of the reference image on the displaying means according to the calculated distance between the object and the pair of imaging lens systems.

19. A rangefinding/autofocusing apparatus according to claim 12; wherein the photodetecting means comprises at least two linear photodetectors.

20. A rangefinding/autofocusing apparatus utilizing a joint transform correlator having a correlation plane, the apparatus comprising:

input image forming means for forming input images, the input image forming means including an imaging lens system for imaging an object to form a pair of object input images, a lens driving mechanism for driving the imaging lens system, recording means for recording the pair of object input images, reference input image forming means for forming a reference input image of a reference image, and displaying means for concurrently displaying the pair of recorded object input images and the reference input image in an offset relation relative to each other;

photodetecting means disposed on a correlation plane of a correlation optical system for detecting correlation peaks corresponding to a correlation coefficient of the pair of displayed object input images so as to measure an interval between the detected correlation peaks, and for detecting correlation peaks corresponding to a correlation coefficient of the reference input image and at least one of the pair of displayed object input images so as to determine a correlation between the reference image and the object;

a calculation unit operative according to the measured interval for calculating a distance between the object and the imaging lens system to determine a just-focus spacing between the displaying means and the imaging lens system; and a feedback mechanism operative according to the determined just-focus spacing for controlling the lens driving mechanism to shift the imaging lens system to thereby establish a just-focus state.

21. A rangefinding/autofocusing apparatus according to claim 20; wherein the calculation unit includes recognizing means for recognizing a target object depending on the correlation between the reference image and the object after the feedback mechanism establishes the just-focus state.

22. A rangefinding/autofocusing apparatus according to claim 20; wherein the reference input image forming means further includes reference image storing means for storing a plurality of reference images, and means for repeatedly changing the reference input image to be displayed on the displaying means to enable selection of a particular reference image having a correlation with the object exceeding a predetermined value.

23. A rangefinding/autofocusing apparatus according to claim 20; wherein the input image forming means includes means for displacing the imaging lens system to repeatedly form images of other objects to enable selection of a particular object having a correlation with the reference image exceeding a predetermined value.

24. A rangefinding/autofocusing apparatus according to claim 20; wherein the input image forming means includes means for changing a size of the reference image displayed on the displaying means depending on the calculated distance between the object and the imaging lens system.

25. A rangefinding/autofocusing apparatus according to claim 24; wherein the calculation unit includes recognizing means for recognizing a target object depending on the correlation between the reference image and the object after the just-focus state is established and the size of the reference image is changed.

26. A rangefinding/autofocusing apparatus according to claim 20; wherein the photodetecting means is disposed on a correlation plane of a Fourier correlation optical system.

* * * * *